United States Patent
Dean et al.

(10) Patent No.: US 10,443,775 B2
(45) Date of Patent: Oct. 15, 2019

(54) SYSTEM, METHOD AND APPARATUS FOR A PIPE COUPLING FOR IRRIGATION

(71) Applicant: NORTH AMERICAN SPECIALTY PRODUCTS LLC, Houston, TX (US)

(72) Inventors: Roy Lucas Dean, Schwenksville, PA (US); Bryan Fitzgerald Allard, West Chester, PA (US); Michael Austin Dotsey, Chester Springs, PA (US)

(73) Assignee: NORTH AMERICAN SPECIALTY PRODUCTS LLC, Houston, TX (US)

(*) Notice: Subject to any disclaimer, the term of this patent is extended or adjusted under 35 U.S.C. 154(b) by 305 days.

(21) Appl. No.: 15/286,398

(22) Filed: Oct. 5, 2016

(65) Prior Publication Data

US 2017/0102106 A1    Apr. 13, 2017

Related U.S. Application Data

(60) Provisional application No. 62/240,288, filed on Oct. 12, 2015.

(51) Int. Cl.
| | | |
|---|---|---|
| *F16L 41/03* | (2006.01) | |
| *F16L 41/02* | (2006.01) | |
| *A01G 25/02* | (2006.01) | |

(52) U.S. Cl.
CPC .......... *F16L 41/021* (2013.01); *A01G 25/02* (2013.01); *F16L 41/03* (2013.01)

(58) Field of Classification Search
CPC ......... F16L 41/021; F16L 41/08; F16L 41/03; F16L 43/008; F16L 47/26; F16L 47/28; F16L 47/32; F16L 47/345

USPC .... 285/5, 125.1, 133.11, 133.21, 133.3, 305, 285/133.5, 179
See application file for complete search history.

(56) References Cited

U.S. PATENT DOCUMENTS

| | | | |
|---|---|---|---|
| 2,678,664 A | | 5/1954 | Bortner |
| 2,916,305 A | * | 12/1959 | Sherman ............... F16L 37/148 285/318 |
| 3,866,951 A | * | 2/1975 | DeLoach ................ F16L 37/54 285/111 |
| 3,971,573 A | * | 7/1976 | Clements ................ F16L 23/08 285/5 |
| 4,461,498 A | | 7/1984 | Kunsman |
| 5,511,826 A | | 4/1996 | Clare et al. |
| 6,123,366 A | | 9/2000 | Kiriakopolos et al. |
| 6,302,445 B1 | * | 10/2001 | Kugele ................. F16L 37/008 285/360 |
| 7,021,672 B2 | | 4/2006 | Ericksen et al. |
| 7,312,407 B2 | | 12/2007 | Case |
| 8,419,072 B2 | | 4/2013 | Sisk |
| 8,459,698 B2 | | 6/2013 | Margargal et al. |

(Continued)

*Primary Examiner* — Aaron M Dunwoody
(74) *Attorney, Agent, or Firm* — Lempia Summerfield Katz LLC (57) ABSTRACT

A pipe coupling may include a body that is tubular and formed from a polymer. The body may include a main bore with a main axis and at least first and second female receptacles on each end of the main bore. Each receptacle may be configured to receive a male end of a pipe. A first brace may be coupled to and extend between, for example, a first female receptacle and a third female receptacle. A second brace may be coupled to extend between, for example, a second female receptacle and the third female receptacle. The pipe coupling can be a single, integral, injection molded monolithic structure.

22 Claims, 5 Drawing Sheets

(56) References Cited

U.S. PATENT DOCUMENTS

| | | |
|---|---|---|
| 8,696,292 B2 | 4/2014 | Dulong |
| 2008/0079258 A1 | 4/2008 | Siegel et al. |
| 2011/0057048 A1 | 3/2011 | McAfee |
| 2012/0161433 A1* | 6/2012 | Magargal ............... F16L 37/148 |
| | | 285/133.3 |
| 2013/0327415 A1* | 12/2013 | Camp, Jr. ............... F16L 47/32 |
| | | 137/15.09 |
| 2014/0346769 A1 | 11/2014 | Gibb et al. |
| 2016/0076682 A1* | 3/2016 | Conrad ................... B29C 65/18 |
| | | 285/21.1 |
| 2018/0263199 A1* | 9/2018 | Duffin .................... F16L 41/021 |
| 2018/0306359 A1* | 10/2018 | Yashin ................... F16L 37/088 |

* cited by examiner

SYSTEM, METHOD AND APPARATUS FOR A PIPE COUPLING FOR IRRIGATION

This application claims priority to and the benefit of U.S. Prov. App. No. 62/240,288, filed Oct. 12, 2015, and is incorporated herein by reference in its entirety.

BACKGROUND OF THE INVENTION

Field of the Disclosure

The present invention relates in general to plumbing and, in particular, to a system, method and apparatus for a pipe coupling for irrigation.

SUMMARY

Embodiments of a pipe coupling may include a body that is tubular and formed from a polymer. The body may include a main bore with a main axis and at least first and second female receptacles on each end of the main bore. Each receptacle may be configured to receive a male end of a pipe. A first brace may be coupled to and extend between, for example, a first female receptacle and a third female receptacle. A second brace may be coupled to extend between, for example, a second female receptacle and the third female receptacle. The pipe coupling can be a single, integral, injection molded monolithic structure.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Embodiments of a system, method and apparatus for a pipe coupling are disclosed. For example, as shown in FIGS. 1-9, the pipe coupling 11 may include a body 13 that is tubular, such as an elbow, a tee, a four-way union or still other fittings as is known in the art.

In some embodiments, the pipe coupling 11 is a single, integral, injection molded monolithic structure. Versions of the pipe coupling 11 may be formed from a polymer, such as one or more of the following materials: polyvinylchloride (PVC), polypropylene (PP), nylon acetyl, high density polyethylene (HDPE) and reinforcements thereof.

Figure 1:
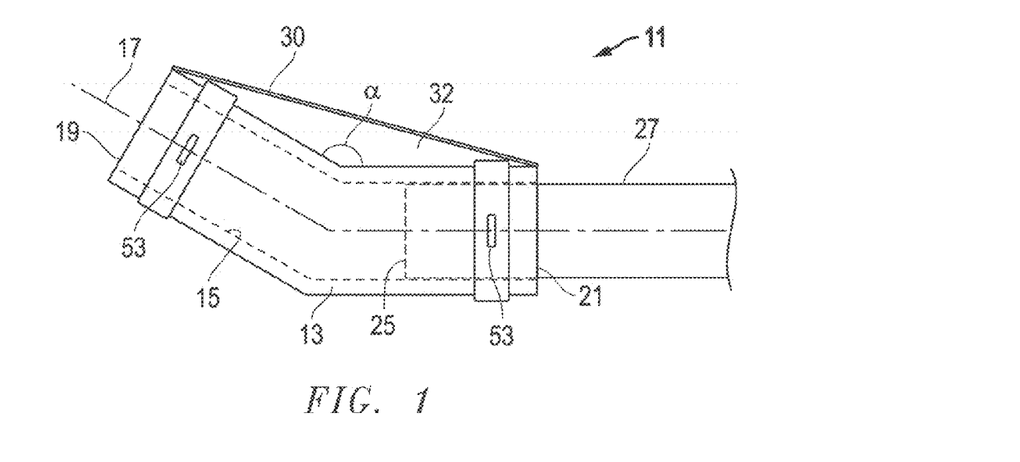
FIG. 1 is a schematic sectional view of an embodiment of a pipe coupling.

Embodiments of the body 13 may include a main bore 15 with an axis 17 and at least two female receptacles 19, 21, 23 (e.g., two are shown in FIG. 1; and three are shown in FIGS. 2-8) that are in fluid communication with the bore 15. In some versions, the two or more female receptacles 19, 21, 23 may have the same inner diameter, the same outer diameter, or both. Each female receptacle 19, 21, 23 may be configured to receive a male end 25 of a pipe 27. Embodiments of a pipe assembly may include one or more pipe couplings 11 and one or more pipes 27 connected to the couplings 11.

Figure 3:
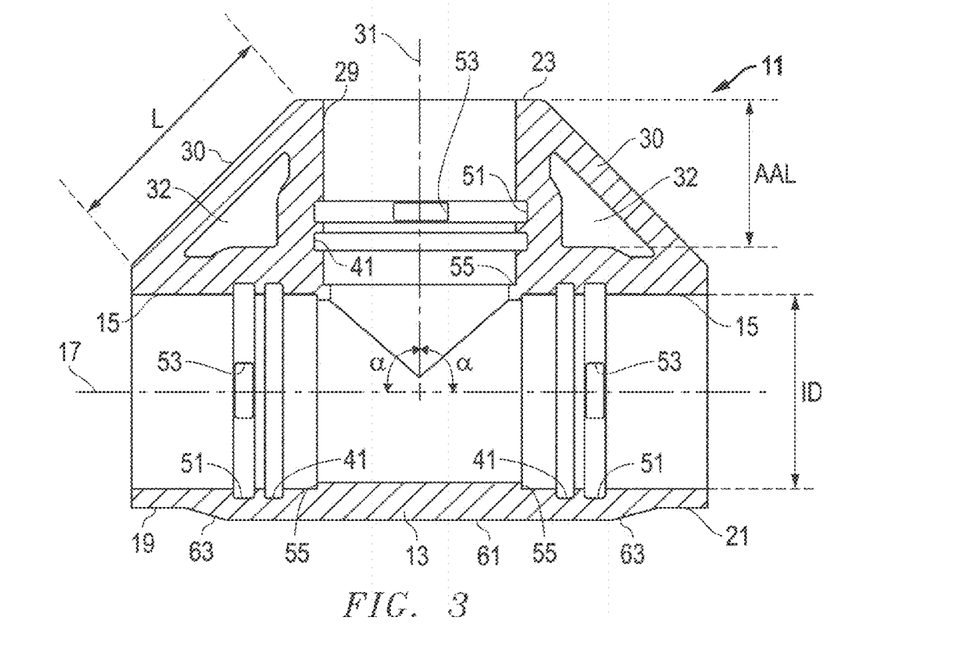
FIG. 3 is a sectional front view of the embodiment of the pipe coupling of FIG. 2, taken along the line 3-3 of FIG. 6.
Figure 4:
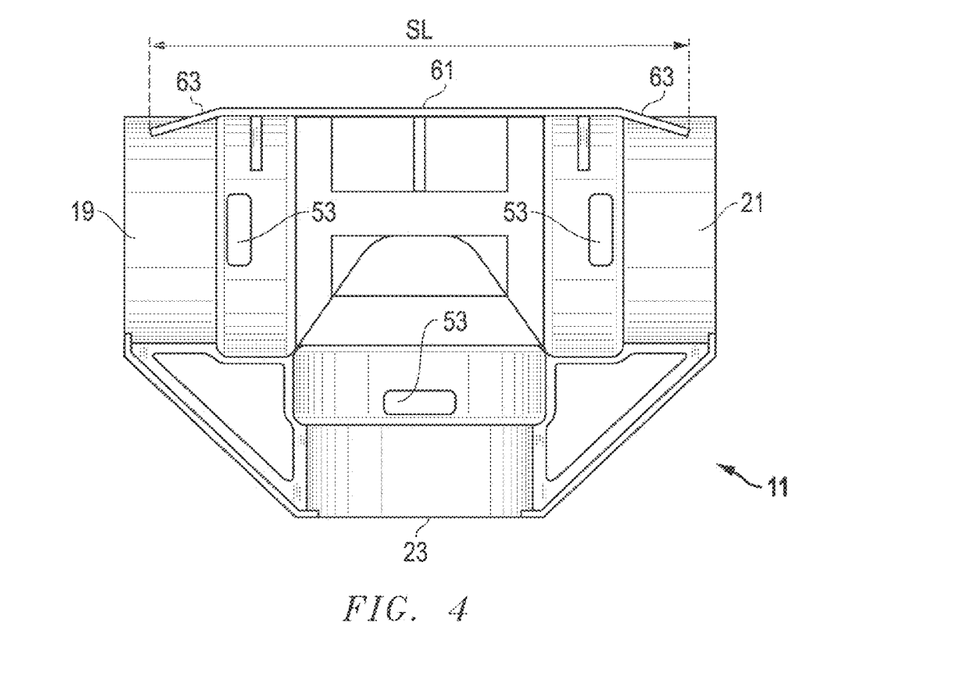
FIG. 4 is a top view of the embodiment of the pipe coupling of FIG. 2.

As best shown in FIG. 3, embodiments of the main bore 15 can have an inner diameter (ID), and the auxiliary bore 29 can have an auxiliary axial length (AAL) along the auxiliary axis 31. A ratio of ID:AAL can be at least about 0.5, such as at least about 0.7, at least about 0.9, or even at least about 1. In other versions, the ratio ID:AAL can be not greater than about 2, such as not greater than about 1.8, not greater than about 1.6, not greater than about 1.4, or even not greater than about 1.2. In still other embodiments, the ratio ID:AAL can be in a range between any of these values.

As shown in the embodiment of FIG. 1 (e.g., an elbow), the axis 17 can be non-linear, such that the least two female receptacles 19, 21 are oriented relative to each other at an angle α of less than 180 degrees. In other examples, the angle α can be at least about 90 degrees (see, e.g., the embodiment of FIGS. 2-8), such as at least about 100 degrees, at least about 110 degrees, at least about 120 degrees, or even at least about 130 degrees. In still other versions, the angle α can be not greater than about 160 degrees, such as not greater than about 150 degrees, not greater than about 140 degrees, not greater than about 130 degrees, or even not greater than about 120 degrees. In some embodiments, the angle α can be in a range between any of these values.

As shown in the embodiment of FIGS. 2-8 (e.g., a tee), the body 13 can have a main bore 15 with a main axis 17. First and second female receptacles 19, 21 may be located on each end of the main bore 15, with each configured to receive the male end of a pipe 27. In addition, an auxiliary bore 29 may extend from the main bore 15 with an auxiliary axis 31. A third female receptacle 23 may be located on an end of the auxiliary bore 29, and configured to receive the male end of a pipe, such as pipe 27 in FIG. 2.

As noted, versions of the main bore 15 and the auxiliary bore 29 have an inner diameter (ID) that can be at least about 2 inches, such as at least about 2.5 inches, or even at least about 3 inches. In other versions, the ID can be not greater than about 5 inches, such as not greater than about 4 inches, or even not greater than about 3.5 inches. Embodiments of the ID can be in a range between any of these values.

The pipe coupling 11 may include the body 13 with a wall thickness. Embodiments of the wall thickness can be substantially constant for the main bore 15 and/or for the auxiliary bore 29. In some examples, the wall thickness may vary by at least about 10%, such as at least about 25%, at least about 50%, at least about 75%, or even at least about 100%. In other versions, the wall thickness can vary by not greater than about 200%, such as not greater than about 175%, not greater than about 150%, not greater than about 125%, or even not greater than about 100%. Versions of the wall thickness can be in a range between any of these values.

In other examples, the pipe coupling 11 may be configured to be removably restrained, coupled and sealed to pipes 27 with mechanical restraints and seals, rather than adhesive or chemical bonds. In some versions, only mechanical restraints (e.g., splines), but no caps, collars or other locking devices are used to secure pipes 27 to the coupling 11.

For example, some embodiments of the bore 15 of the pipe coupling 11 may further include recesses 41 that are configured to retain seals, such as o-rings, gaskets and the like. In the FIG. 3 version, recesses 41 are shown adjacent each of the female receptacles 19, 21, 23.

Also in the embodiment of FIG. 3, each of the three female receptacles 19, 21, 23 may be provided with a mechanical restraint groove 51 in an interior thereof. In addition, a mechanical restraint aperture 53 may extend from the exterior of coupling 11, to a respective one of the mechanical restraint grooves 51 in the interior of coupling 11.

Figure 2:
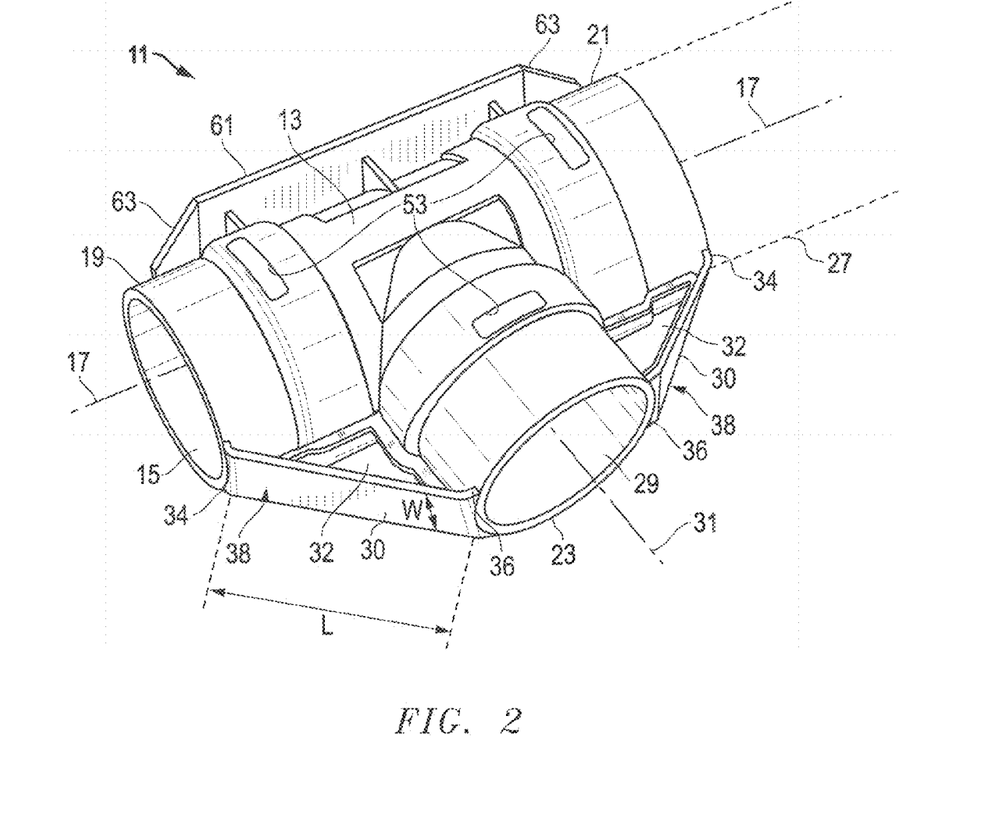
FIG. 2 is a top, front isometric view of another embodiment of a pipe coupling.

Embodiments of the coupling 11 may include one or more braces 30. Brace 30 may be coupled to and extend between two of the female receptacles. For example, in FIG. 1, a single brace 30 connects female receptacles 19, 21. In the example of FIGS. 2 and 3, a first brace 30 connects female receptacles 19, 23, and a second brace 30 connects female receptacles 21, 23. The one or more braces 30 may be molded and integrally formed with the coupling 11. In some versions, the braces 30 can be mirror images of each other about a plane perpendicular to the main axis 17 and through the auxiliary axis 31. Examples of the braces 30 may extend to axial ends of the female receptacles 19, 21, 23, such that portions of the braces 30 are flush with the axial ends of the female receptacles 19, 21, 23.

For some embodiments of the brace(s) 30, an aperture 32 may be defined between the brace 30 and the body 13. The aperture 32 provides an open space between the brace 30 and the body 13. In some versions, the aperture 32 can be generally triangular in shape. Embodiments of the brace 30 may include a diagonal ramp, as shown, relative to the main axis 17 and the auxiliary axis 31. The diagonal ramp of the brace 30 may include a first shoulder 34 (FIGS. 2 and 3) adjacent and perpendicular to the main axis 17, and/or a second shoulder 36 adjacent and perpendicular to the auxiliary axis 31. The diagonal ramp of the brace 30 may include a flat surface 38 facing outward away from the body 13. The flat surface 38 can be perpendicular to a plane defined by the main axis 17 and the auxiliary axis 31.

Embodiments of the diagonal ramps of the braces 30 can be oriented at an angle relative to the main axis 17. For example, the angle can be at least about 30 degrees, such as at least about 35 degrees, or even at least about 40 degrees. In other versions, the angle can be not greater than about 60 degrees, such as not greater than about 55 degrees, or even not greater than about 50 degrees. Versions of the angle can be in a range between any of these values.

In some embodiments, the flat surface 38 can have a length L (FIGS. 2 and 3) extending between respective ones of the female receptacles (e.g., 19, 23). The flat surface 38 also can have a width W (FIG. 2) perpendicular to the length L. In some versions, the width W can be at least about 0.2 of an inner diameter (ID) of one of the female receptacles, such as at least about 0.3 ID, at least about 0.4 ID, or even at least about 0.5 ID. In other versions, the width W can be not greater than about 1.0 ID, such as not greater than about 0.9 ID, not greater than about 0.8 ID, or even not greater than about 0.7 ID. Embodiments of the width W also can be in a range between any of these values.

Some embodiments of the main bore 15 may include a rib 55 (FIG. 3) that is axially spaced apart from but adjacent to one of the female receptacles (e.g., 19) relative to the main axis 17. The rib 55 may be configured to be a mechanical stop for a pipe inserted into female receptacle 19. Similarly, the other female receptacles 21, 23 can include respective ribs 55 axially spaced apart from but adjacent to them relative to their respective axes 17, 31. These ribs 55 also are configured to be mechanical stops for pipes inserted therein. Embodiments of the main bore 15 and the auxiliary bore 29 can have substantially constant inner diameters (ID), other than respective ones of the seal grooves 41, mechanical restraint recesses 51 and ribs 55.

Figure 5:
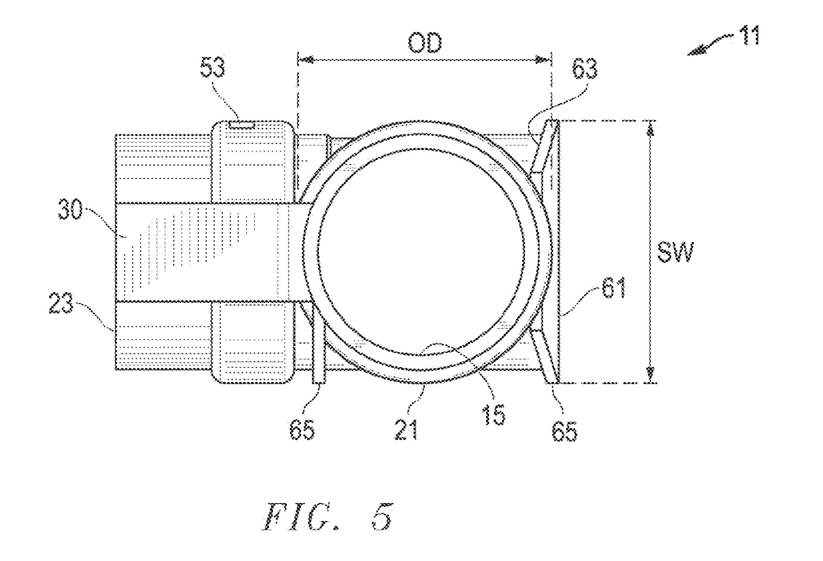
FIG. 5 is a rear view of the embodiment of the pipe coupling of FIG. 2.
Figure 6:
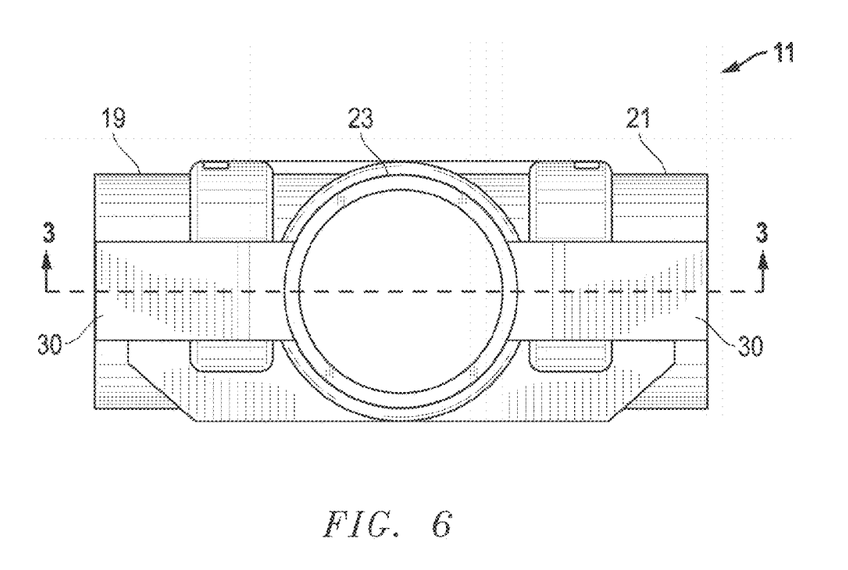
FIG. 6 is a left side view of the embodiment of the pipe coupling of FIG. 2.
Figure 7:
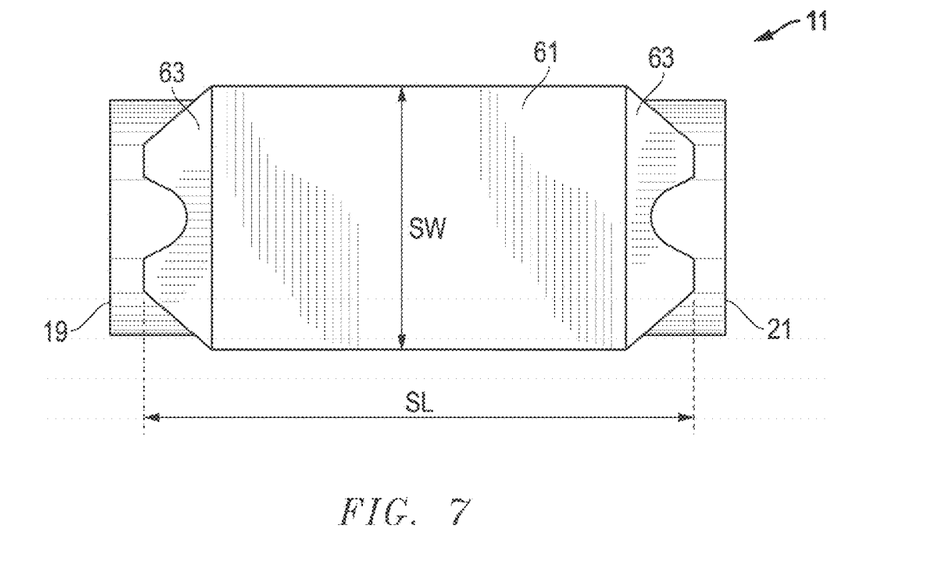
FIG. 7 is a right side view of the embodiment of the pipe coupling of FIG. 2.
Figure 8:
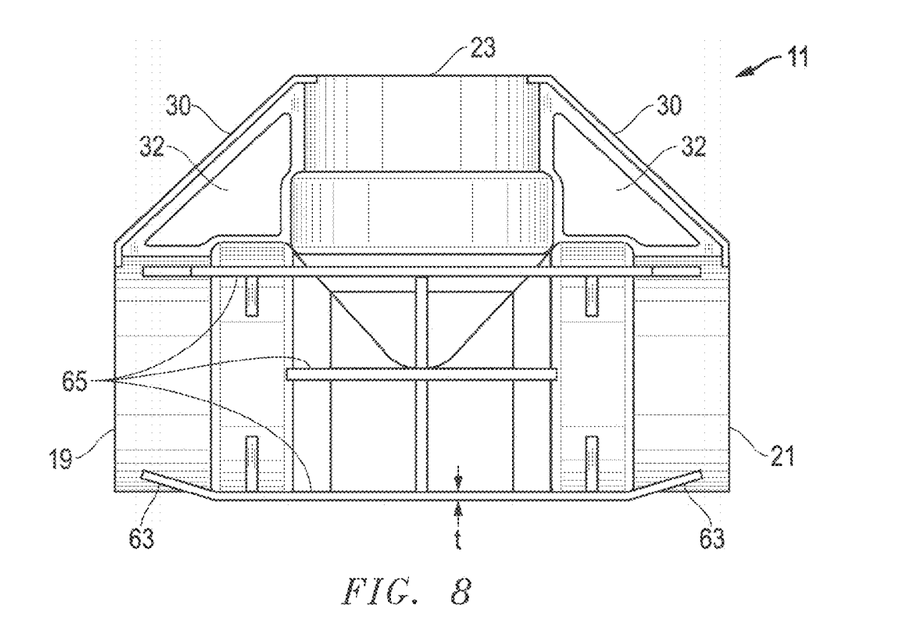
FIG. 8 is a bottom view of the embodiment of the pipe coupling of FIG. 2.
Figure 9:
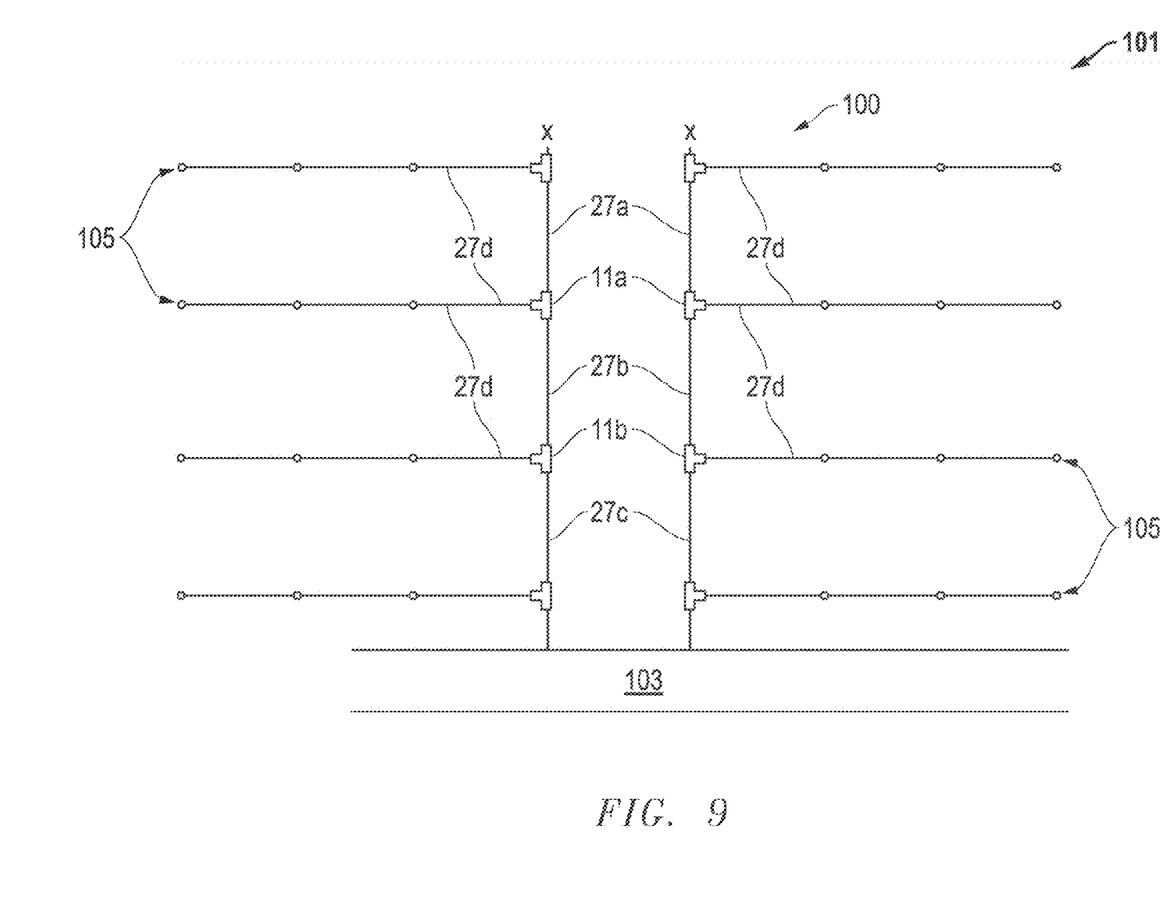
FIG. 9 is a schematic plan diagram of an irrigation system layout for a farm.

In still another embodiment, the body 13 of the pipe coupling 11 may include a sled 61 (FIGS. 2-8). The sled 61 can be substantially planar and located opposite the third female receptacle 23. For example, the sled 61 may include opposed edges 63 that are inclined relative to a main body of the sled 61, and intersect the first and second female receptacles 19, 21, respectively. In one version, the body 13 has an outer diameter (OD; FIG. 5), and the sled 61 may include a sled length SL (FIGS. 4 and 7) extending in a same direction as the main axis 17. A sled width SW (FIGS. 5 and 7) can be perpendicular to the sled length SL. In some versions, the sled width SW can be at least about 0.7 OD, such as at least about 0.8 OD, or even at least about 0.9 OD. In other versions, the sled width SW can be not greater than about 1.2 OD, such as not greater than about 1.1 OD, or even not greater than about 1.0 OD. Embodiments of the sled width SW can be in a range between any of these values.

In some versions of coupling 11, only a side of the body 13 has the sled 61, such that an upper surface and a lower surface of the body 13 between the sled 61 and the third female receptacle 23 are substantially unobstructed. In one example, the lower surface is obstructed only by ski runners 65 (FIGS. 5 and 8), one of which comprises an edge of the sled 61. In some embodiments, each ski runner 65 can have a thickness "t" of, for example, not greater than about 5 mm, such as not greater than about 4 mm, or even not greater than about 3 mm. The thickness t of the ski runners 65 also can be in a range between any of these values.

Some embodiments include a method of installing an irrigation system 100 (FIG. 9) at a farm. For example, embodiments of such a method may include providing a plurality of tee couplings 11 and a plurality of pipes 27. The method also may include attaching first and second pipes 27a, 27b to a first tee coupling 11a (e.g., at receptacles 19, 21) with removable mechanical restraints (e.g., splines, as described herein) to form an assembly. The method may then include dragging the assembly into a field 101, above ground, at the farm. The method may further include attaching another tee coupling 11b to an end of the assembly to add to the assembly, attaching another pipe 27c to said another tee coupling 11b to further add to the assembly, and continuing to drag the assembly into the field 101. These steps may be repeated to continue to add to the assembly, until a desired length of the assembly is achieved. In addition, the method may include attaching an additional pipe 27d to each of the tee couplings 11 with additional removable mechanical restraints to form a final assembly with rows 105 of irrigation sprinklers, and then connecting the final assembly to a water source 103 to irrigate the field 101 with the final assembly.

Embodiments of the pipe couplings 11 may be configured to go through farming equipment in an axial direction without being disassembled from the pipes 27. For example, the pipe couplings 11 and the pipes 27 may be configured to be lifted by a tractor in a farm, processed through a roller system on the tractor in the axial direction, and placed back in the farm by the tractor without being disassembled. In one version (e.g., FIG. 9), the axial direction may be defined along the main axis of a tee coupling 11a, rather than the auxiliary axis of the third female receptacle. In such a version, two pipes 27a, 27b may remain connected to the tee 11a at the first and second female receptacles on the main axis. A third pipe 27d would be disassembled from the third female receptacle on the auxiliary axis so that the assembly could be processed through the roller system without disassembling the first and second pipes 27a, 27b.

In another embodiment, a method of farming with an irrigation system 100 may include installing an irrigation assembly 100 in a field 101, above ground, at a farm. The irrigation system may include tee couplings 11, pipes 27 connected to the tee couplings 11 (e.g., at receptacles 19, 21, 23). Each tee coupling 11 may include guard elements (e.g., braces 30) extending adjacent to the pipes 27. The method may include disconnecting at least one of the pipes 27 from a tee coupling 11 (e.g., at receptacle 23), such that the tee coupling 11 has an open receptacle (e.g., at receptacle 23) that is not coupled to said at least one of the pipes 27. In addition, the method may include farming the field 101 and processing portions of the irrigation assembly 100 through a roller system on a tractor, such that the open receptacles (e.g., at receptacle 23) of the tee couplings 11 are oriented horizontally (not vertically), and the guard elements 30 protect the open receptacles 23 from damage by the roller system.

Embodiments of the method also may include disconnecting two of the pipes 27 from the tee coupling 11, such that the tee coupling 11 has two open receptacles that are not coupled to said two of the pipes 27. Thereafter, the method may include farming the field 100 and processing portions of the irrigation assembly 101 through the roller system on the tractor, such that the open receptacles of the tee coupling 11 are oriented horizontally, and the guard elements 30 protect the open receptacles from damage by the roller system.

Other versions may include one or more of the following embodiments:

Embodiment 1

A pipe coupling, comprising:
a body that is tubular and formed from a polymer, the body has a main bore with a main axis and first and second female receptacles on each end of the main bore, each configured to receive a male end of a pipe, and an auxiliary bore extending from the main bore with an auxiliary axis and a third female receptacle on an end of the auxiliary bore, also configured to receive a male end of a pipe;
a first brace coupled to and extending between the first female receptacle and the third female receptacle;
a second brace coupled to extending between the second female receptacle and the third female receptacle; and
the pipe coupling is a single, integral, injection molded monolithic structure.

Embodiment 2

The pipe coupling of any of these embodiments, wherein the pipe coupling is one of a tee coupling and a four-way union.

Embodiment 3

The pipe coupling of any of these embodiments, wherein each of the three female receptacles has a mechanical restraint groove in an interior thereof, and a mechanical restraint aperture extending from an exterior thereof to a respective one of the mechanical restraint grooves.

Embodiment 4

The pipe coupling of any of these embodiments, wherein the first, second and third female receptacles have at least one of a same inner diameter and a same outer diameter.

Embodiment 5

The pipe coupling of any of these embodiments, wherein the main bore has an inner diameter (ID), and the auxiliary bore has an auxiliary axial length (AAL) along the auxiliary axis, and a ratio of ID:AAL is at least about 0.5, at least about 0.7, at least about 0.9, at least about 1, and not greater than about 2, not greater than about 1.8, not greater than about 1.6, not greater than about 1.4, not greater than about 1.2.

Embodiment 6

The pipe coupling of any of these embodiments, wherein a first aperture is defined between the first brace and the body, and a second aperture is defined between the second brace between the body, such that there are open spaces between the braces and the body.

Embodiment 7

The pipe coupling of any of these embodiments, wherein each of the first and second apertures is generally triangular in shape.

Embodiment 8

The pipe coupling of any of these embodiments, wherein each of the first and second braces is a diagonal ramp relative to the main and auxiliary axes.

Embodiment 9

The pipe coupling of any of these embodiments, wherein each of the diagonal ramps comprises a first shoulder adjacent and perpendicular to the main axis, and a second shoulder adjacent and perpendicular to the auxiliary axis.

Embodiment 10

The pipe coupling of any of these embodiments, wherein each diagonal ramp comprises a flat surface facing outward away from the body.

Embodiment 11

The pipe coupling of any of these embodiments, wherein each flat surface is perpendicular to a plane defined by the main and auxiliary axes.

Embodiment 12

The pipe coupling of any of these embodiments, wherein at least one of the female receptacles has an inner diameter (ID); and each flat surface has a length extending between respective ones of the female receptacles, and a width perpendicular to the length, and the width is at least about 0.2 ID, at least about 0.3 ID, at least about 0.4 ID, at least about 0.5 ID, and not greater than about 1.0 ID, not greater than about 0.9 ID, not greater than about 0.8 ID, not greater than about 0.7 ID.

Embodiment 13

The pipe coupling of any of these embodiments, wherein the main bore comprises:
a first rib axially spaced apart from but adjacent to the first female receptacle relative to the main axis, and configured to be a mechanical stop for a first pipe;
a second rib axially spaced apart from but adjacent to the second female receptacle relative to the main axis, and configured to be a mechanical stop for a second pipe; and the auxiliary bore comprises:
a third rib axially spaced apart from but adjacent to the third female receptacle relative to the auxiliary axis, and configured to be a mechanical stop for a third pipe.

Embodiment 14

The pipe coupling of any of these embodiments, wherein the main bore has a substantially constant inner diameter, other than:
ribs configured to be mechanical stops for abutting pipes;
seal grooves configured to retain seal members; and
mechanical restraint recesses configured to retain mechanical restraints.

Embodiment 15

The pipe coupling of any of these embodiments, wherein the auxiliary bore has a substantially constant inner diameter, other than:
a rib configured to be a mechanical stop for an abutting pipe;
a seal groove configured to retain a seal member; and
a mechanical restraint recess configured to retain a mechanical restraint.

Embodiment 16

The pipe coupling of any of these embodiments, wherein the first and second braces are mirror images of each other about a plane perpendicular to the main axis and through the auxiliary axis.

Embodiment 17

The pipe coupling of any of these embodiments, wherein the body comprises a sled that is substantially planar and located opposite the third female receptacle.

Embodiment 18

The pipe coupling of any of these embodiments, wherein the sled comprises opposed edges that are inclined relative to a main sled body, and intersect the first and second female receptacles, respectively.

Embodiment 19

The pipe coupling of any of these embodiments, wherein the body has an outer diameter (OD); and
the sled has a sled length extending in a same direction as the main axis, and a sled width perpendicular to the sled length, and the sled width is at least about 0.7 OD, at least about 0.8 OD, at least about 0.9 OD, and not greater than about 1.2 OD, not greater than about 1.1 OD, not greater than about 1.0 OD.

Embodiment 20

The pipe coupling of any of these embodiments, wherein only a side of the body has the sled, such that an upper surface and a lower surface of the body between the sled and the third female receptacle are substantially unobstructed.

Embodiment 21

The pipe coupling of any of these embodiments, wherein the lower surface is obstructed only by ski runners, one of which comprises an edge of the sled.

Embodiment 22

The pipe coupling of any of these embodiments, wherein each ski runner has a thickness of not greater than about 5 mm, not greater than about 4 mm, not greater than about 3 mm.

Embodiment 23

The pipe coupling of any of these embodiments, wherein only mechanical restraints, but no caps, collars or other locking devices are used to secure three pipes to the coupling.

Embodiment 24

The pipe coupling of any of these embodiments, wherein the braces extend to axial ends of the female receptacles, such that portions of the braces are flush with the axial ends of the female receptacles.

Embodiment 25

The pipe coupling of any of these embodiments, wherein the main bore and the auxiliary bore each have an inner diameter (ID) of at least about 2 inches, at least about 2.5 inches, at least about 3 inches, and not greater than about 5 inches, not greater than about 4 inches, not greater than about 3.5 inches.

Embodiment 26

The pipe coupling of any of these embodiments, wherein the polymer used to form the body comprises at least one of the following materials: polyvinylchloride (PVC), polypropylene (PP), nylon acetyl, high density polyethylene (HDPE) and reinforcements thereof.

Embodiment 27

The pipe coupling of any of these embodiments, wherein the braces are oriented at an angle relative to the main axis, and the angle is at least about 30 degrees, at least about 35 degrees, at least about 40 degrees, and not greater than about 60 degrees, not greater than about 55 degrees, not greater than about 50 degrees.

Embodiment 28

The pipe coupling of any of these embodiments, wherein the body has a wall thickness that is substantially constant for the main bore and the auxiliary bore, and the wall thickness varies by at least about 10%, at least about 25%, at least about 50%, at least about 75%, at least about 100%, and not greater than about 200%, not greater than about 175%, not greater than about 150%, not greater than about 125%, not greater than about 100%.

Embodiment 29

The pipe coupling of any of these embodiments, wherein each of the main bore and the auxiliary bore further comprise a recess configured to retain a seal.

Embodiment 30

A pipe coupling, comprising:
a body that is tubular and formed from a polymer, the body has a bore with an axis and at least two female receptacles in fluid communication with the bore, each female receptacle is configured to receive a male end of a pipe, and the axis is non-linear such that two of said at least two female receptacles are oriented relative to each other at an angle of less than 180 degrees;
a brace coupled to and extending between said two of said at least two female receptacles; and
the pipe coupling is a single, integral, injection molded monolithic structure.

Embodiment 31

The pipe coupling of any of these embodiments, wherein the angle is at least about 90 degrees, at least about 100 degrees, at least about 110 degrees, at least about 120 degrees, at least about 130 degrees, and not greater than about 160 degrees, not greater than about 150 degrees, not greater than about 140 degrees, not greater than about 130 degrees, not greater than about 120 degrees.

Embodiment 32

The pipe coupling of any of these embodiments, wherein the pipe coupling is an elbow, a tee or a four-way union.

Embodiment 33

The pipe coupling of any of these embodiments, wherein the bore further comprises recesses configured to retain seals.

Embodiment 34

The pipe coupling of any of these embodiments, wherein the pipe coupling is configured to be removably restrained, coupled and sealed to the pipes with mechanical restraints and seals.

Embodiment 35

The pipe coupling of any of these embodiments, wherein the pipe coupling is configured to go through farming equipment in an axial direction without being disassembled from the pipes.

Embodiment 36

The pipe coupling of any of these embodiments, wherein the pipe coupling and pipes are configured to be lifted by a tractor in a farm, processed through a roller system on the tractor in the axial direction, and placed back in the farm by the tractor without being disassembled.

Embodiment 37

A tee coupling for pipes, comprising:
a tee body that is tubular and injection molded from a polymer, the tee body has a main bore with a main axis, and first and second female receptacles on each end of the main bore, an auxiliary bore extending from the main bore with an auxiliary axis, and a third female receptacle on an end of the auxiliary bore, each of the female receptacles is configured to receive a male end of a pipe, and each of the female receptacles comprises a mechanical restraint recess in an interior thereof, and a mechanical restraint aperture extending from an exterior thereof to a respective one of the mechanical restraint recesses.

Embodiment 38

A tee coupling for pipes, comprising:
a tee body that is tubular and formed from a polymer, the tee body has a main bore with a main axis, and first and second female receptacles on each end of the main bore, an auxiliary bore extending from the main bore with an auxiliary axis, and a third female receptacle on an end of the auxiliary bore, each of the female receptacles is configured to receive a male end of a pipe, the female receptacles comprise inner diameters that are substantially identical, and a sled integrally formed with the tee body and located opposite the third female receptacle.

Embodiment 39

A method of installing an irrigation system at a farm, the method comprising:
(a) providing a plurality of tee couplings and a plurality of pipes;
(b) attaching first and second pipes to a first tee coupling with removable mechanical restraints to form an assembly, and dragging the assembly into a field, above ground, at the farm;
(c) attaching another tee coupling to an end of the assembly to add to the assembly, attaching another pipe to said another tee coupling to further add to the assembly, and continuing to drag the assembly into the field; then
(d) repeating step (c) to continue to add to the assembly, until a desired length of the assembly is achieved; and then
(e) attaching an additional pipe to each of the tee couplings with additional removable mechanical restraints to form a final assembly, and then connecting the final assembly to a water source to irrigate the field with the final assembly.

Embodiment 40

A method of farming with an irrigation system, the method comprising:
(a) installing an irrigation assembly in a field, above ground, at a farm, the irrigation system comprising a tee coupling, first, second and third pipes connected to the tee coupling, and the tee coupling comprises guard elements extending from adjacent the third pipe to adjacent each of the first and second pipes;

(b) disconnecting at least one of the pipes from the tee coupling, such that the tee coupling has an open receptacle that is not coupled to said at least one of the pipes; and then (c) farming the field and processing portions of the irrigation assembly through a roller system on a tractor, such that the open receptacle of the tee coupling is oriented horizontally, and the guard elements protect the open receptacle from damage by the roller system.

Embodiment 41

The method of any of these embodiments, wherein step (b) comprises disconnecting two of the pipes from the tee coupling, such that the tee coupling has two open receptacles that are not coupled to said two of the pipes; and step (c) comprises:

farming the field and processing portions of the irrigation assembly through the roller system on the tractor, such that the open receptacles of the tee coupling are oriented horizontally, and the guard elements protect the open receptacles from damage by the roller system.

Embodiment 42

A pipe assembly, comprising:

a tee coupling for pipes as defined by any of these embodiments; and at least two pipes connected to the coupling with mechanical restraints.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A pipe coupling, comprising:
a body that is tubular and formed from a polymer, the body has a main bore with a main axis and first and second female receptacles on each end of the main bore, each configured to receive a male end of a pipe, and an auxiliary bore extending from the main bore with an auxiliary axis and a third female receptacle on an end of the auxiliary bore, also configured to receive a male end of a pipe, the main axis and the auxiliary axis positioned in a reference plane bisecting the body;
a first brace coupled to and extending between the first female receptacle and the third female receptacle;
a second brace coupled to extending between the second female receptacle and the third female receptacle; and
the pipe coupling is a single, integral, injection molded monolithic structure,
wherein the first and second brace each have a width oriented perpendicular to the reference plane and a thickness in a direction parallel to the reference plane, and
wherein the width is greater than the thickness.

2. The pipe coupling of claim 1, wherein the pipe coupling is one of a tee coupling and a four-way union.

3. The pipe coupling of claim 1, wherein each of the three female receptacles has a mechanical restraint groove in an interior thereof, and a mechanical restraint aperture extending from an exterior thereof to a respective one of the mechanical restraint grooves.

4. The pipe coupling of claim 1, wherein the first, second and third female receptacles have at least one of a same inner diameter and a same outer diameter.

5. The pipe coupling of claim 1, wherein a first aperture is defined between the first brace and the body, and a second aperture is defined between the second brace between the body, such that there are open spaces between the braces and the body.

6. The pipe coupling of claim 1, wherein each of the first and second braces is a diagonal ramp relative to the main and auxiliary axes.

7. The pipe coupling of claim 1, wherein the main bore comprises:

a first rib axially spaced apart from but adjacent to the first female receptacle relative to the main axis, and configured to be a mechanical stop for a first pipe;

a second rib axially spaced apart from but adjacent to the second female receptacle relative to the main axis, and configured to be a mechanical stop for a second pipe; and the auxiliary bore comprises:

a third rib axially spaced apart from but adjacent to the third female receptacle relative to the auxiliary axis, and configured to be a mechanical stop for a third pipe.

8. The pipe coupling of claim 1, wherein the main bore has a substantially constant inner diameter, other than:
ribs configured to be mechanical stops for abutting pipes;
seal grooves configured to retain seal members; and
mechanical restraint recesses configured to retain mechanical restraints.

9. The pipe coupling of claim 1, wherein the first and second braces are mirror images of each other about a plane perpendicular to the main axis and through the auxiliary axis.

10. The pipe coupling of claim 1, wherein the body comprises a sled that is substantially planar and located opposite the third female receptacle.

11. The pipe coupling of claim 1, wherein the main bore and the auxiliary bore each have an inner diameter (ID) of at least about 2 inches, and not greater than about 5 inches.

12. The pipe coupling of claim 1, wherein the polymer used to form the body comprises at least one of the following materials: polyvinylchloride (PVC), polypropylene (PP), nylon acetyl, high density polyethylene (HDPE) and reinforcements thereof.

13. The pipe coupling of claim 1, wherein the braces are oriented at an angle relative to the main axis, and the angle is at least about 30 degrees, and not greater than about 60 degrees.

14. The pipe coupling of claim 1, wherein each of the main bore and the auxiliary bore further comprise a recess configured to retain a seal.

15. A pipe coupling, comprising:
a body that is tubular and formed from a polymer, the body has a bore with an axis and at least two female receptacles in fluid communication with the bore, each female receptacle is configured to receive a male end of a pipe, and the axis is non-linear such that two of said at least two female receptacles are oriented relative to each other at an angle of less than 180 degrees;

a brace coupled to and extending between said two of said at least two female receptacles, wherein an aperture is formed between the brace and the at least two female receptacles such that ends of the brace are connected to the at least two female receptacles whereas a portion of the brace between the ends is not connected to the body; and the pipe coupling is a single, integral, injection molded monolithic structure.

16. The pipe coupling of claim 15, wherein the pipe coupling is an elbow, a tee or a four-way union.

17. The pipe coupling of claim 15, wherein the bore further comprises recesses configured to retain seals.

18. The pipe coupling of claim 15, wherein the pipe coupling is configured to be removably restrained, coupled and sealed to the pipes with mechanical restraints and seals.

19. The pipe coupling of claim 15, wherein the pipe coupling is configured to go through farming equipment in an axial direction without being disassembled from the pipes.

20. The pipe coupling of claim 19, wherein the pipe coupling and pipes are configured to be lifted by a tractor in a farm, processed through a roller system on the tractor in the axial direction, and placed back in the farm by the tractor without being disassembled.

21. A tee coupling for pipes, comprising:
a tee body that is tubular and formed from a polymer, the tee body has a main bore with a main axis, and first and second female receptacles on each end of the main bore, an auxiliary bore extending from the main bore with an auxiliary axis, and a third female receptacle on an end of the auxiliary bore, each of the female receptacles is configured to receive a male end of a pipe, the female receptacles comprise inner diameters that are substantially identical, and a sled integrally formed with the tee body and located opposite the third female receptacle and extending parallel to the main axis of the main bore along an outside of the body.

22. A method of farming with an irrigation system, the method comprising:
(a) installing an irrigation assembly in a field, above ground, at a farm, the irrigation system including a tee coupling according to claim 21, first, second and third pipes connected to the tee coupling, wherein the tee coupling further includes guard elements extending from adjacent the third pipe to adjacent each of the first and second pipes;

(b) disconnecting at least one of the pipes from the tee coupling, such that the tee coupling has an open receptacle that is not coupled to said at least one of the pipes; and then (c) farming the field and processing portions of the irrigation assembly through a roller system on a tractor, such that the open receptacle of the tee coupling is oriented horizontally, and the guard elements protect the open receptacle from damage by the roller system.

* * * * *